(12) United States Patent
Kunkel et al.

(10) Patent No.: US 7,566,981 B2
(45) Date of Patent: Jul. 28, 2009

(54) ACTUATING DRIVE AND EMERGENCY ENERGY SUPPLY DEVICE

(75) Inventors: Steffen Kunkel, Hösbach (DE);
Karl-Günter Herrmann, Karlstadt (DE); Michael Hörning, Triefenstein (DE); Berno Kobelbauer, Gössenheim (DE); Jörg Dantlgraber, Lohr am Main (DE); Stephan Becker, Großostheim (DE); Gunther Neidlein, Lohr am Main (DE); Bernd Schnurr, Lohr am Main (DE)

(73) Assignee: Bosch Rexroth AG, Stuttgart (DE)

( * ) Notice: Subject to any disclaimer, the term of this patent is extended or adjusted under 35 U.S.C. 154(b) by 279 days.

(21) Appl. No.: 11/479,453

(22) Filed: Jun. 29, 2006

(65) Prior Publication Data

US 2007/0024227 A1   Feb. 1, 2007

(30) Foreign Application Priority Data

Jun. 29, 2005  (DE) .................. 10 2005 030 709

(51) Int. Cl.
*F03D 9/00* (2006.01)
*H02P 9/04* (2006.01)

(52) U.S. Cl. .......................... 290/44; 290/55
(58) Field of Classification Search ............... 290/44, 290/55; 416/132 B; 415/4.5; 60/398
See application file for complete search history.

(56) References Cited

U.S. PATENT DOCUMENTS

| | | | | |
|---|---|---|---|---|
| 1,362,794 A | * | 12/1920 | Hoffman | 320/123 |
| 1,778,793 A | * | 10/1930 | Constantin | 290/44 |
| 2,230,526 A | * | 2/1941 | Claytor | 290/44 |
| 3,484,617 A | * | 12/1969 | August | 290/44 |
| 3,721,290 A | * | 3/1973 | Butler, Jr. | 165/85 |
| 4,171,491 A | * | 10/1979 | Theyse | 290/1 R |
| 6,819,086 B2 | * | 11/2004 | Wobben | 320/166 |
| 2002/0008499 A1 | * | 1/2002 | Henry | 323/267 |
| 2003/0231009 A1 | * | 12/2003 | Nemoto et al. | 323/276 |

(Continued)

FOREIGN PATENT DOCUMENTS

DE   297 22 109   7/1998

(Continued)

*Primary Examiner*—Julio Gonzalez
(74) *Attorney, Agent, or Firm*—Kenyon & Kenyon LLP

(57) ABSTRACT

An actuating drive for a rotor blade in a wind power installation is provided with an electric motor and a frequency converter which has a rectifier that is to be fed from a power supply system, a link connected to the rectifier, and a d.c.-to-a.c. inverter for feeding the motor, the link carrying a specified nominal operating voltage in a network-fed normal operation of the frequency converter. Furthermore, an auxiliary energy supply device is provided that is connected to the link. The auxiliary energy supply device includes and energy store which makes available a support voltage that amounts to less than 80% of the nominal operating voltage of the link. A diode is connected between the energy store and the link, and is arranged, with regard to its forward direction, in such a way that it feeds a support voltage from the energy store into the link if the link voltage falls below the support voltage. The diode prevents a current flow between the energy store and the link if the link voltage is greater than the support voltage. A charging device for the energy store has a lower charging voltage than the nominal operating voltage of the link.

17 Claims, 2 Drawing Sheets

U.S. PATENT DOCUMENTS

| | | | | |
|---|---|---|---|---|
| 2005/0017685 A1* | 1/2005 | Rees et al. | | 320/132 |
| 2005/0151657 A1* | 7/2005 | Lockhart et al. | | 340/636.1 |
| 2007/0116567 A1* | 5/2007 | Luetze | | 416/97 R |
| 2007/0152453 A1* | 7/2007 | Hicks et al. | | 290/55 |

FOREIGN PATENT DOCUMENTS

| | | |
|---|---|---|
| DE | 100 33 029 | 1/2002 |
| DE | 103 35 575 | 3/2005 |

* cited by examiner

ACTUATING DRIVE AND EMERGENCY ENERGY SUPPLY DEVICE

FIELD OF THE INVENTION

The present invention relates to an actuating drive for a rotor blade of a wind power installation. Furthermore, the present invention relates to an emergency energy supply device for supplying an electrical actuating drive of a wind power installation in emergency operation.

BACKGROUND INFORMATION

Wind power installations of high performance are almost exclusively equipped with adjustable rotor blades. Because of that, the performance of the wind power installation may be adjusted to the wind speed, and may be limited, if necessary, in response to high wind speeds. If there is danger of overloading by strong wind, or in order to take the installation out of operation, the rotor blades are rotated into a so-called feathered pitch, in which no driving buoyancy is created on the rotor blades. In part, it is sufficient to put a rotor blade into feathered pitch, in order to brake the wind power installation. Preferably all rotor blades are rotated out of the wind.

Usually, each rotor blade is furnished with its own adjusting drive, a so-called pitch drive, which is situated in the rotor hub. An electric drive is mostly used for the pitch drive. In response to the failure of the supply voltage, however, it must be ensured that the rotor blades continue to be adjustable, and are able to be rotated into the feathered setting.

A conventional pitch drive is described in German Published Patent Application No. 103 35 575. The drive includes a three-phase a.c. motor and a frequency converter for driving the motor. The frequency converter is made up of a rectifier that is connected to a power supply system, of a link and of a controlled inverter that generates three-phase current for the motor. An emergency energy supply is connected to the link which supplies the link with energy in response to failure of the power supply system. The emergency energy supply includes an electrical energy store, for instance, accumulators or capacitors, which are connected to the link via a switch and a post-connected charging resistor. A diode is connected in parallel to the charging resistor. If the switch is closed, a charging current is able to flow from the link via the charging resistor into the energy store. In emergency operation, a current flows predominantly via the diode from the energy store into the link.

The disadvantage with the conventional rotor blade actuating drive is that the energy store of the emergency supply has to be designed for a high voltage, especially for a high charging voltage that corresponds to the link operating voltage. Electrical energy stores for high voltages are, as a rule, constructed from a large number of accumulators or capacitors that are connected one after another. The costs of the energy store rise with the number of accumulators/capacitors connected in series. At the same time, the reliability, the maintenance friendliness and the service life of the energy store decreases with the number of the elements.

An adjusting drive for the rotor blades of a wind power installation based on a DC motor is described in German Published Patent Application No. 297 22 109. The DC motor is fed from a battery. The battery is reloaded from a rectifier. The drive, including the battery, is located in the rotor, usually in the rotor hub of the wind power installation.

Conventional lead-acid or lead-gel accumulators are little suited to be positioned in the rotating rotor hub, since they have a high requirement for space and a large weight. In addition, such accumulator systems are, as a rule, not operable independently of position. In addition, lead-acid or lead-gel accumulators are difficult to monitor, since the accumulator voltage permits only an inaccurate conclusion as to the charging state. This impairs the service life, since such accumulators have to be charged more frequently than is actually necessary, for safety reasons. Generally, lead accumulators are subject to relatively high wear, and are therefore maintenance-intensive.

It is proposed in German Published Patent Application No. 100 33 029 to implement an emergency supply device for the blade adjustment drive of a wind power installation having capacitors, particularly of the type "Ultra-Cap", as the energy store.

However, electrical capacitors are expensive and store a low quantity of electrical energy compared to batteries and accumulators. Besides that, only a small part of the stored energy is usable for drive purposes, since the voltage decreases linearly with the amount of current drawn. If several adjustment procedures of rotor blades are to be undertaken in emergency operation, without there being the possibility of meanwhile recharging the energy store, the energy stored in a capacitor will not be sufficient under certain circumstances.

SUMMARY OF THE INVENTION

It is the object of the present invention to state an improved, more fail-safe, low-maintenance and cost effectively producible actuating drive of a wind power installation, especially an actuating drive for a rotor blade. This also makes obvious the object of improving an emergency energy supply device for an actuating drive of a wind power installation, especially with respect to reliability, maintenance requirement and adaptation to the installation position.

The actuating drive according to the present invention, having an electric motor and a frequency converter, has an emergency energy supply device whose energy store makes available a support voltage which amounts to less than 80% of a nominal operating voltage, which the link carries in normal operation, that is, during supply from the network-fed rectifier. The energy store is separated from the link in the normal operation of the frequency converter by a diode, and is not damaged by the higher operating voltage of the link. In emergency operation, the energy store automatically stabilizes the voltage of the link via the diode to, or, if a voltage drop at the diode is taken into consideration, slightly below the support voltage of the energy store. In addition, a charging device is provided for the energy store whose charging voltage is lower than the nominal operating voltage of the link.

The present invention fulfills the requirements, that are very high, particularly for wind power installations, on the reliability and fail-safe behavior of the rotor blade pitch drive, in a very efficient and cost-effective manner, compared to usual drives. The present invention uses the knowledge that an electric motor may still be reliably driven even below the usual link operating voltage. The energy store for the emergency energy supply is therefore designed for a clearly lower voltage than the normal operating voltage of the link. Accordingly, the energy store is able to be constructed from a lower number of elements connected in series, for instance, accumulators or capacitors. Even at a voltage of the energy store below 80% of the normal link voltage, an especially cost-effective and maintenance-friendly construction of the emergency energy supply device is assured. An additional simplification and cost savings is derived from the use of an energy store having a support voltage of less than 70%, below 60% or below 50% of the nominal operating voltage of the link. Thus, approximately 15 to 16 lithium ion accupacks would be required, having a nominal voltage of 36 Volt, in order to cover the link voltage of 565 Volt. A reduction in the emergency operating voltage to below 80% of the normal link voltage is equivalent to a savings of 3 or 4 accupacks per actuating drive. In response to a reduction to 50%, indeed 8 accupacks are saved. The reduction in the number of potentially maintenance-requiring accumulator units also reduces the maintenance expenditure. When 12 Volt lead accumulators are used, the piece numbers have to be tripled.

In addition, there is a sufficiently large difference between the voltage of the energy store and the nominal operating voltage of the link, so that a current drain from the energy store, based on load-conditional voltage dips at the link, need not be feared. Because of this, the load state of the energy store is able to be ascertained and monitored more simply and more reliably. In addition, a longer service life of the energy store is achieved.

A reliable emergency operation of the motor is assured even at a low support voltage by an appropriate design of the motor. A further safeguarding of the emergency operation is able to take place in that, in the establishment of the support voltage, a statistical failure probability for the elements forming the energy store, such as accumulators, is taken into consideration, so that the energy store still makes available sufficient voltage for a safe emergency operation, even in response to the failure of such elements. The statistical failure probability may also be greatly reduced by conducting maintenance as required and by diagnosis functions integrated into the emergency energy supply device.

It is also assured that the link is not impaired by the charging voltage. A charging current made available by the battery charger now flows into the energy store, and a charging process is able to take place completely independently of the operating state of the converter. If there is the possibility that the battery charger is switched on even in emergency operation, it can be protected against too high a current load. Preferably, an electronic current limiting is used, in order to minimize the maintenance expenditure.

According to one further aspect of the present invention, an emergency energy supply device is specified, for the supply of an electrical actuating drive of a wind power installation in emergency operation, that is, in response to the failure of a power supply system that supplies the actuating drive with electrical energy during normal operation. The emergency energy supply device includes an energy store which has a plurality of accumulator units connected in series, and a charging device for charging the accumulator units. The specialty is the use of a plurality, in particular 8 lithium ion accumulator units (so-called accupacks) as energy store.

Lithium ion accumulator units are also used for other applications, such as accudriven tools, and are therefore very cost-effectively obtainable from mass production. The preferably used Bosch lithium ion accupacks are, in addition, fully developed technologically, are submitted to strict quality control and are sufficient for high load capacity requirements.

The accumulator units each have a nominal voltage of 36 V, so that an energy store formed from 8 accumulator units makes available a nominal voltage of 288 V. The electromotor can be reliably driven using this voltage. The voltage is preferably selected in such a way that a minimum operating voltage of the supplied drive can still be safely achieved even at a low charging state of the accumulator. This is assured if the nominal voltage of the energy store exceeds the minimum operating voltage by about 20%. The high current loading capacity and the capacity of the lithium ion accupacks assure a sufficient motor power for adjusting the rotor blades into the feathered position.

In the wind power installation, the accumulators for the emergency energy supply should be situated as near as possible to the rotor blade actuating drives, that is, in the rotor hub, in order to save on lines and to avoid current conduction laden with errors via a slip ring. However, in the rotor hub only a small amount of space is available. In addition, the accumulators must not be impaired by the rotation of the rotor hub. Lithium ion accupacks satisfy these requirements that are specific for wind power installations in optimum fashion, since lithium ion accumulators are lighter and more compact with respect to the stored energy quantity than other accumulator systems or capacitors. Thus, lithium ion accumulators have only ⅓ of the size and weight of lead gel accumulators. In addition, lithium ion accumulators may be operated independently of position, in contrast to lead gel accumulators.

Besides that, the charging state of lithium ion accumulators is able to be monitored precisely, using simple means. The charging state may be recorded very much more accurately than, for instance, for lead accumulators, in particular, by a simple voltage measurements. Thus the energy store formed of lithium ion accumulators may be held at all times to a sufficient charging state, and has a high reliability. The lithium ion accumulators may be recharged reliably as a function of their charging state, because of the simple calculability of the charging state. This reduces the number of the charging cycles carried out in a certain time span, compared to conventional accumulator energy stores, which, for safety reasons, are charged more often than is actually necessary, or using a compensation charging current. In addition, it makes possible maintenance as required.

In lithium ion accumulators, the cycle count and the calendar service life of the accumulator units increase considerably if a charging state between approximately 40% and approximately 70% of capacity of the accumulator unit is not undershot nor exceeded. This can technically be implemented easily by a simple and precise calculability of the charging state. Consequently, lithium ion accumulators have a high cycle count and a high calendar service life in response to suitable state monitoring and charging strategy. The effect of chemical decomposition known in lithium ion accumulators may thus be reduced to a minimum. The memory effect known from nickel-cadmium accumulators does not occur, in this instance.

Consequently, the present invention is based on the knowledge that lithium ion accumulator units, because of their low requirement for maintenance, their favorable dimensions, their reliability, the ability precisely to monitor their state, and because of their long achievable service life make possible an efficient, cost-effective and reliable emergency energy supply device for a wind power installation, although they are subject to slow chemical decomposition.

Another advantageous refinement provides that the charging device is developed for charging an individual accumulator unit, and that a switching device is present, via which the battery charger is able to be connected to respectively each of the accumulator units. In this way, each accumulator unit is able to be charged separately and independently of the other accumulator units, and an optimal charging state of the individual accumulator units can be achieved by using a single cost-effective charging device.

Preferably, a control unit in each case checks the charging state of the individual accumulator units, and activates the switching device as a function of the result of the checking. This assures a reliable state monitoring and influencing of the accumulator units. A high degree of availability of the emergency energy supply device and thus of the actuating drive is achieved.

A control of the accumulator charging state that is simple, efficient and according to demand is achieved if an accumulator unit is connected to the battery charger in response to the voltage falling below a specified voltage. By this charging method, the number of charging cycles is able to be kept as low as possible. Thus there comes about an energy-efficient operation of the emergency energy supply device. The long service life achieved thereby, as well as the reduced maintenance requirement of the accumulator units are advantageous specifically for the operation of wind power installations.

Each accumulator unit is preferably provided with its own monitoring circuit, by which the voltage and the temperature of the accumulator unit is able to be recorded. If a communications connection between the monitoring circuit and the control unit can be produced, the state of the accumulator unit may be scanned in a simple and efficient manner by the control unit, and taken into consideration in the control of the accumulator charging state. Besides that, an accumulator defect detection may be carried out in a simple manner, for instance, using abnormal voltage and temperature values.

Another embodiment provides determining the internal resistance of an accumulator unit. For instance, it is possible to determine the internal resistance of an accumulator unit, among others, from the accumulator voltage, during a discharging process via a known resistor. The internal resistance permits making a meaningful estimate of the working capacity of the accumulator unit, and thus also of the emergency energy supply device. An increased internal resistance is also a measure of the aging of the accumulator unit. Therefore, a maintenance indication is preferably activated if the internal resistance is greater than a first threshold value. In this way, maintenance according to demand is assured, and so is an optimal availability of the actuating drive.

If an accumulator unit is shunted out if its internal resistance exceeds a second threshold value, this prevents the performance of the emergency energy supply device from being impaired to a greater extent by a high-resistance accumulator unit than by the omission of the accumulator unit. The second threshold value may be set higher than the first threshold value, in order to make possible the substitution for an aged accumulator unit in good time. If the first and second threshold values are equal, this yields a particularly simple design of the control unit.

Since the internal resistance is temperature dependent, the first and second threshold values preferably follow a characteristics curve that is a function of the temperature of the accumulator unit which, in particular, goes down with increasing temperature. In this way, the maintenance indication permits a reliable statement concerning the aging of the accumulator.

DETAILED DESCRIPTION

Figure 1:
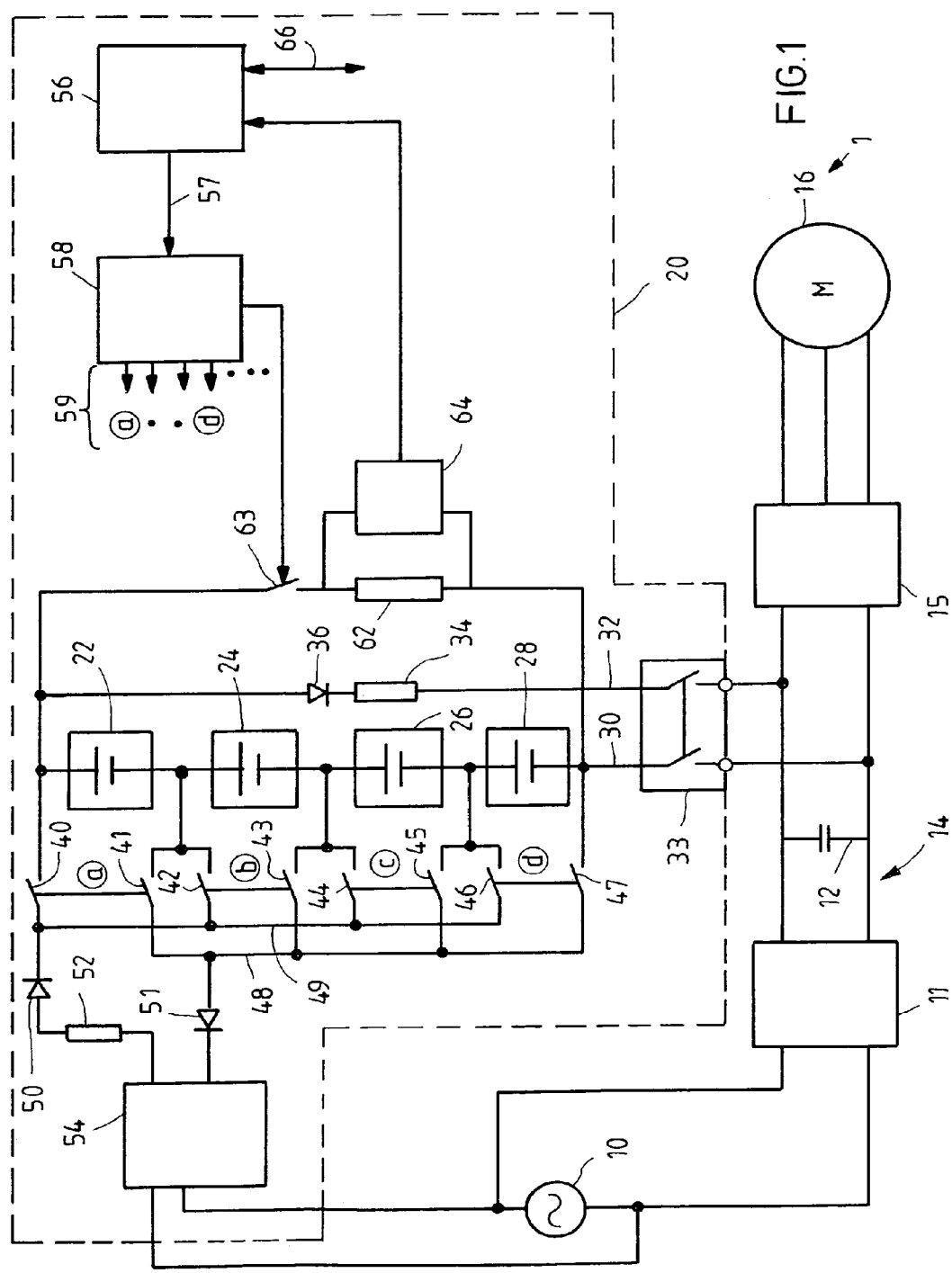
FIG. 1 shows a block diagram of a three-phase a.c. power controller having an emergency energy supply device.

FIG. 1 shows a simplified block diagram of a three-phase a.c. power actuating drive0 1, for use as a rotor blade adjustment drive in a wind power installation. An a.c. mains system 10 supplies a rectifier 11, which, in turn, feeds a link capacitor 12 of a direct voltage link 14 with direct voltage. A d.c.-to-a.c. inverter 15 takes electrical energy from link 14, in order to drive a three-phase a.c. motor 16. D.c.-to-a.c. inverter 15 is activated by a control unit (not shown), so as to specify the three-phase current frequency with which motor 16 is driven. Rectifier 11, link 14 and d.c.-to-a.c. inverter 15 and the control unit mentioned form a frequency converter for driving motor 16.

An emergency energy supply device 20 is connected to direct voltage link 14. An electrical energy store is formed from eight accumulator units connected in series. Each of the accumulator units has a nominal voltage of 36 Volt. The energy store accordingly delivers a voltage of 288 Volt. Deviating from this for reasons of clarity, FIG. 1 shows a circuit including only 4 accumulator units 22, 24, 26, 28. However, this circuit is able to be expanded without any problem to a greater number of accumulator units.

The energy store is connected to link 14 via two supply leads 30 and 32. Supply leads 30 and 32 are breakable by switch 33. In supply line 32 a fuse 34 is disposed to protect link 14 and accumulator units 22, 24, 26, 28. In addition, a diode 36 is connected into supply line 32. The forward direction of diode 36 is selected so that a current flow can occur from the energy store into link 14 only when the link voltage falls below the support voltage of the energy store, namely, accumulator units 22, 24, 26, 28 that are connected in series. If the link voltage is greater than the voltage of the energy store, diode 36 prevents a current flow between link 14 and accumulator units 22, 24, 26, 28.

Each of accumulator units 22, 24, 26, 28 is able to be connected via two switches 40, 41 and 42, 43; 44, 45 and 46, 47 to a pair of leads 48, 49, in the manner shown. The pair of leads 48, 49 is connected to a charging circuit 54 via diodes 50 and 51 as well as via fuse 52. Instead of fuse 52, an electronic current limiting circuit may also be used. Charging circuit 54 is, in turn, connected to a power supply system 10. The forward direction of diodes 50 and 51 is selected so that accumulator units 22, 24, 26, 28 are not able to discharge via charging circuit 54.

The activation of switches 40, 41, 42, 43, 44, 45, 46 and 47 takes place by a microcontroller 56. Microcontroller 56 is connected to a driver circuit 58, which amplifies the activation signals 57 of microcontroller 56, and emits them as switching signals 59. Switching signals 59 are routed to switches 40, 41, 42, 43, 44, 45, 46 and 47. As may be seen from FIG. 1, the switches are activated in common respectively in pairs 40, 41; 42, 43; 44, 45 and 46, 47. The switching signal connections, which are not drawn in for reasons of clarity, are characterized by lower case letters a, b, c and d.

An 8-bit microcontroller of the type "Microchip PIC16F877" may be used as microcontroller 56. In order to generate the requisite number of switching signals 59, a demultiplexer (not shown) is connected between a parallel data interface of microcontroller 56 and driver circuit 58. From a data value, the demultiplexer generates binary switching signals which are amplified in driver circuit 58.

Furthermore, there is a resistor 62 that is able to be connected via a switch 63 to accumulator units 22, 24, 26, 28, that are connected in series. Switch 63 is able to be activated by microcontroller 56 via driver circuit 58. A voltage measuring unit 64 is disposed in parallel to resistor 62, and it records the dropping voltage at resistor 62. A data line for transmitting recorded voltage values connects voltage measuring unit 64 to microcontroller 56.

Between microcontroller 56 and accumulator units 22, 24, 26, 28 there is a further data line 66, via which microcontroller 56 is able to scan the terminal voltage and the temperature of the accumulator units. The construction of one of accumulator unit 22 is shown in greater detail in FIG. 2. In principle, accumulator units 22, 24, 26, 28 are all constructed in the same manner.

Figure 2:
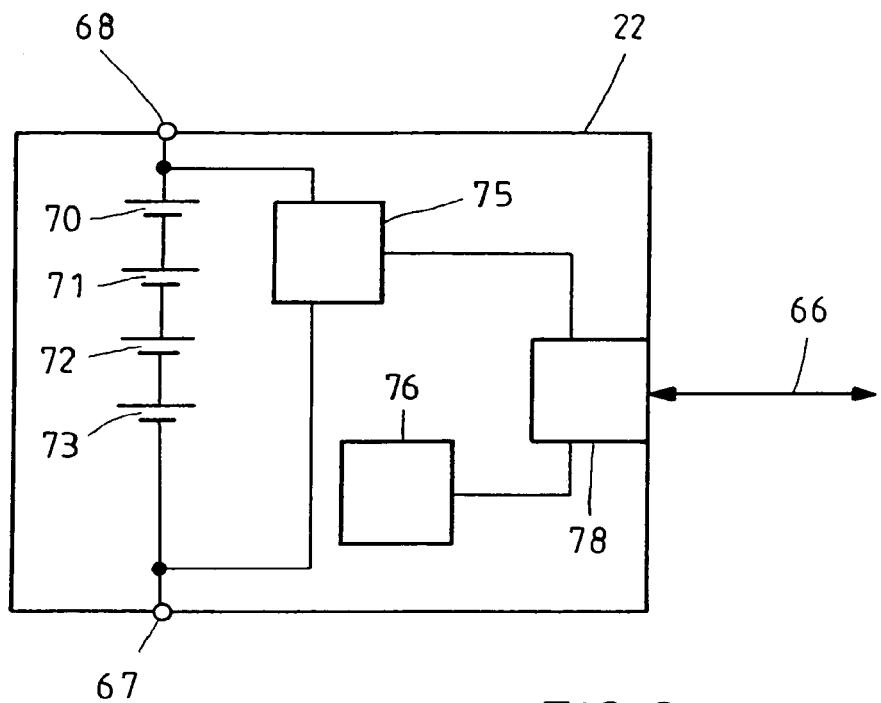
FIG. 2 shows a detailed block diagram of an accumulator unit that is used in the circuit shown in FIG. 1.

As may be seen in FIG. 2, between connecting terminals 67, 68 of accumulator unit 22, a certain number of accumulator cells 70, 71, 72, 73 are disposed in series. Only 4 cells are shown in FIG. 2. The actual number of the cells connected in series comes about directly from the required nominal voltage of accumulator unit 22. In order to attain a greater storage capacity, in addition, accumulator cells may also be disposed in a parallel connection to accumulator cells 70, 71, 72, 73. The accumulator units used in the exemplary embodiment include in each case twenty lithium ion accumulator cells, of which, in each case, ten accumulator cells are connected in series. This yields a respective nominal voltage of the accumulator units of 36 Volt.

A voltage measuring device 75, that is situated on accumulator units 22, records the terminal voltage. Besides that, there is a temperature sensor 76 which records the temperature on the inside of accumulator units 22. Temperature sensor 76 and voltage measuring device 75 are connected to data line 66 via a communications interface 78.

Figure 3:
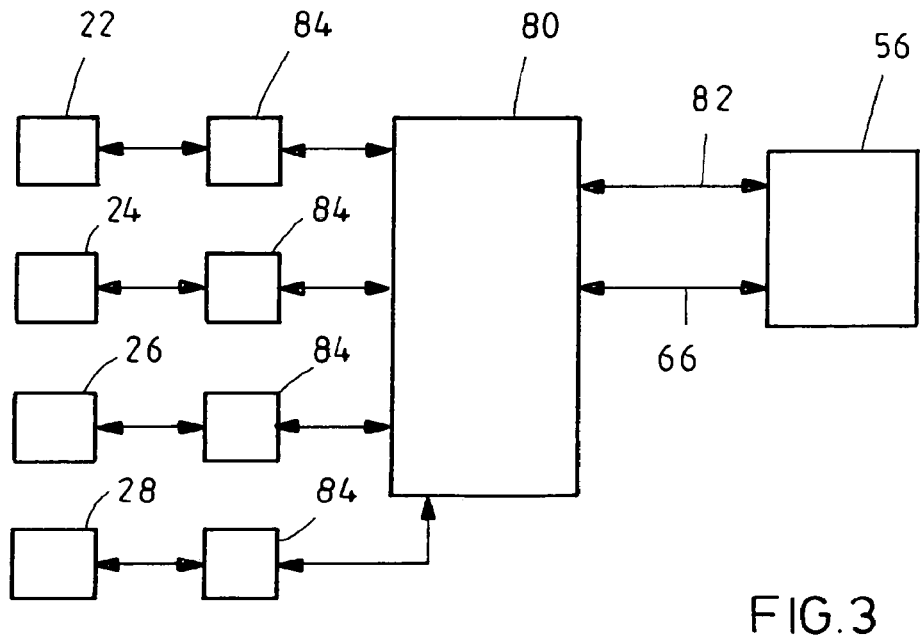
FIG. 3 shows a schematic circuit sketch of a data transmission connection between a plurality of accumulator units and a microcontroller.

Preferably, accumulator units having 3 terminal contacts are used, connecting terminals 67, 68 and having one additional contact for the data transmission. The data signal is present between the data contact and connecting terminal 67, which forms the minus pole of accumulator unit 22. Since accumulator units 22, 24, 26, 28 are connected in series with respect to the voltage, negative connecting terminals 67 are not able to be connected together to form a common data bus between microcontroller 56 and accumulator units 22, 24, 26, 28. As shown in FIG. 3, instead, a multiplexer 80 is connected in data line 66, between microcontroller 56 and accumulator units 22, 24, 26, 28. The multiplexer is activated by microcontroller 56 using a control signal 82, and makes a data connection between microcontroller 56 and an accumulator unit specified by microcontroller 56. Between accumulator units 22, 24, 26, 28 and multiplexer 80, optocouplers 84 are connected, in order to decouple the voltage level of the respective accumulator unit from the voltage level of microcontroller 56.

Below, the method of functioning of a.c. three-phase current adjusting drive 1 will be described. In normal operation, during supply from power supply system 10, rectifier 11 charges link capacitor 12 to a nominal operating voltage. The nominal operating voltage of the link is equivalent to the peak voltage of the power supply system at a normal mains supply that is free from faults. In a European three-phase a.c. mains system this peak voltage is approximately 565 Volt. D.c.-to-a.c. inverter 15 converts the link direct voltage to a three-phase current for driving motor 16. Since the method of functioning of such a frequency converter is sufficiently well known to one skilled in the art, we do without a detailed description at this point.

Microcontroller 56 monitors accumulator units 22, 24, 26, 28. In addition, microcontroller 56 scans, at regular intervals, the voltage values and the temperature values of voltage measuring devices 75 and temperature sensors 76 via data line 66. If the temperature of an accumulator unit exceeds an admissible maximum value, microcontroller 56 activates a warning indication. Preferably or alternatively, microcontroller 56 also induces a warning message to a control station (not shown) of the wind power installation. For this purpose, microcontroller 56 is connected to the control station via a data line.

If the voltage of an accumulator unit drops below a lower specified voltage, microcontroller 56 induces a recharging of this accumulator unit. In addition, using switches 40, 41 or 42, 43; 44, 45 or 46, 47, microcontroller 56 makes a connection between this accumulator unit and charging circuit 54. Charging circuit 54 is designed for charging one individual accumulator unit. The end-of-charging voltage that the charging circuit makes available at a maximum is 40 Volt. Microcontroller 56 monitors the voltage of the accumulator unit during charging, and terminates the charging process as soon as a certain upper specified voltage is attained. The upper specified voltage is able to be equivalent to the end-of-charging voltage. In order to terminate the charging process, the charged accumulator unit is separated from charging circuit 54.

In the lithium ion accumulator units used, the cycle count and the calendar service life of the accumulator units increase considerably if a charging state between approximately 40% and approximately 70% of capacity of the accumulator unit is not undershot or not exceeded. The lower specified voltage is therefore set to be greater than the end-of-discharge voltage, and the upper specified voltage is set to be less than the end-of-charging voltage, in order to maintain the named charging state range.

Furthermore, microcontroller 56 determines at regular intervals the internal resistance of each of accumulator units 22, 24, 26, 28, in order to monitor aging of the accumulator units. To do this, microcontroller 56 activates switch 63 for a predetermined duration, so that a current flows via resistor 62 from accumulator units 22, 24, 26, 28. The voltage drop occurring in this context at resistor 62 is recorded by voltage measuring unit 64. The strength of the discharging current is able to be determined from this voltage drop. While switch 63 is closed, the voltage of each accumulator unit is recorded as well. For the calculation of the internal resistance Ri of an accumulator unit, according to the known computing rule $$Ri = -(U2-U1)/(I2-I1)$$

the recording is required of an additional voltage/current value pair. Expediently, one may use for this the voltage of the unloaded accumulator unit and the appertaining current value I=0.

Microcontroller 56 has a program for recording the voltage values of the accumulator units in the uncharged state, and in the charged state to record the appertaining discharging current as well, and in order to use these data to calculate the internal resistance of each accumulator unit. Based on the calculation of the internal resistance, the microcontroller is able to determine a measure for the aging of the accumulator unit, since the internal resistance of an accumulator unit continuously increases with increasing age and with the number of discharging cycles/charging cycles. To be sure, the internal resistance is strongly temperature-dependent In order to obtain a reliable statement about the aging of an accumulator unit, microcontroller 56 also records the temperature of the accumulator unit during the current and voltage measurements for determining the internal resistance, for instance, while switch 63 is closed. The internal resistance is valued with the aid of the measured temperature.

A simple maintenance indication for replacing an accumulator unit that is no longer sufficiently operative, based on its aging and its increased internal resistance, may be implemented by comparing the internal resistance to a threshold value. Taking into consideration the accumulator temperature is achieved by a threshold value which drops off with rising temperature, based on a fixed characteristics curve. If the internal resistance exceeds the threshold value, microcontroller 56 triggers a warning indication, or sends a warning message to a central control station.

Furthermore, it is advantageous to provide a circuit system (not shown) with which each of the accumulator units can be shunted out. This shunting circuit is also able to be activated by microcontroller 56. If the internal resistance of an accumulator unit exceeds an additional threshold value above the threshold value for the maintenance indication, a current path parallel to this accumulator unit is activated by the shunting circuit. In that way it can be prevented that a high-resistance accumulator unit inadmissibly limits the support current from the accumulator units. In the emergency operation described below, a reliable support of the intermediate voltage is achieved, even though on a voltage level that is lower, by the voltage of the shunted-out accumulator unit. What is also prevented is a strong heating-up of the high-resistance accumulator unit and damage to emergency energy supply device 20.

Accumulator units 22, 24, 26, 28 are delivered in a pre-charged state. Consequently, the energy store makes available a high voltage already upon delivery. Switches 33 have the function of securing transport emergency energy supply device 20, and are kept open for transport, maintenance and assembly purposes. After the mounting of actuating drive 1, switches 33 are closed.

An emergency operation sets in when power supply system 10 fails based on a malfunction or its voltage drops strongly. As soon as the voltage of the link falls below the voltage of the accumulator units that are connected in series, a support current flows automatically from the accumulator units via diode 36 into the link and supports the link voltage. The supported link voltage is less than the voltage of the accumulator in-series connection only by the voltage drop at the diode. The power that can be taken from accumulator units 22, 24, 26, 28 amounts to a multiple of the power that is needed for a movement of a rotor blade into the feathered position. Consequently, even in the case of the failure of power supply system 10, a secured emergency operation including a certain shut-down of the wind power installation is assured.

In order to avoid a shut-down in response to a network failure of short duration, the operation of the wind power installation is able to be kept up alternatively using the emergency supply from the accumulator units for a certain time period. If the network fault lasts for a while, then, after a certain time, the installation is shut down with the aid of the rotor blade actuating drives, before, however, the accumulators are exhausted. This time period is a function of the capacitance and the loading state of the accumulators. In such an emergency operation concept, the accumulator loading state is preferably also recorded during the emergency operation, so as to be able to shut down the installation in time.

Of course, an interruption-free current supply (not shown) is also provided for the control components required for activating the actuating drive, and particularly for activating the inverter, so that the controllability of the rotor blades is assured when power supply system 10 fails.

Power supply system 10 may be a public power supply system. Power supply system 10 may also be an internal power supply system of the wind power installation, that is fed from the generator of the wind power installation, and from a public network when there is no wind. Charging circuit 54 may be connected to link 14 instead of to a.c. mains system 10, and may have a direct current converter for generating a lower charging voltage compared to the link nominal operating voltage.

Switches 41, 42, . . . 47, shown in FIG. 1, may be implemented as electromechanical switching elements, especially as relays or as electrical semiconductor switches. When using relays, there comes about an especially cost-effective construction of emergency energy supply device 20 and a secure galvanic separation between charging circuit 54 and that one of accumulator units 22, 24, 26, 28 that is just not being charged.

The circuit shown in FIG. 1 is easily able to be adapted to any number of accumulator units. For this, the desired number of accumulator units is connected in series, and for each accumulator unit one pair of switches is provided for connecting to lines 48 and 49 that lead to the charging circuit. Furthermore, the number of switching signals, which microcontroller 56 or driver circuit 58 is able to generate, is adapted appropriately. The control program of microcontroller 56 should be designed so that all accumulator units are taken into consideration in the state monitoring and the charging processes that were described.

The eight lithium ion accumulator units that are connected in series, which were named at the outset, make available a support voltage of 288 Volt. Consequently, the support voltage is roughly equivalent to 50% of the nominal operation voltage of the link. A further reduction of the support voltage, and thus of the number of accumulator units is possible, as long as a certain operation of the electric motor is assured. The torque and the power of three-phase a.c. motor 16 become reduced with a reduction in the motor's supply voltage. Thereby there comes about, as a function of the load, a lesser rotary speed and a longer adjustment duration for the rotor blade.

The influence of the decreased voltage may be partially compensated for by installing a more powerful motor that is actually over-dimensioned for normal operation. Such a motor still makes available sufficient power and torque, even in response to operation using a lowered voltage. An intelligent control of d.c.-to-a.c. inverter 15 ensures a low-loss partial load operation of the motor in normal operation. It is therefore expedient to design the motor output in such a way that a safe operation is assured even using emergency operating voltage. In the design of the motor, an additional voltage reduction by, if necessary, one or two shunted-out accumulator units should be considered, in order to attain an additional increase in operating safety.

Cost-effective, advantageous implementations of emergency energy supply device 20 may come about, depending on the accumulators used and the motor operating data, which are designed for a support voltage of less than 60% or less than 70% of the link nominal operating voltage. Thus it is optionally of advantage to provide a support voltage of 60% or 70% of the nominal operating voltage, instead of a support voltage of 50% of the link nominal operating voltage, if a motor that is more cost-effective and has a smaller volume can thereby be used.

Even if the support voltage is less than 80% of the nominal operating voltage of the link, a substantially more cost-effective and simplified construction of emergency energy supply device 20 is derived compared to an emergency energy supply store which supports the link voltage at the level of the nominal operating voltage. In addition, a simple and automatic switching in of the emergency energy is assured only in cases of an actual network failure. A brief, slight sudden drop in the link voltage above the support voltage, for instance, by an increased motor load, does not yet lead to the drawing of energy from the accumulators. That is why their charging state can be stated reliably at any time.

The small number of the accumulators connected in series, the charging of individual ones of the accumulator units connected in series, the monitoring of the charging state and the monitoring of the aging enable a long service life and a maintenance according to demand of emergency energy supply device 20. Thereby a high reliability and availability of actuating drive 1 are ensured. The use of frequency converter technology permits the use of a three-phase a.c. motor 16 that is practically free of wear.

Emergency energy supply device 20 shown in FIG. 1 can, of course, also be used as an emergency energy supply device of a direct current blade actuating drive (direct current pitch drive) of a wind power installation. In such a system, emergency energy supply device 20 is electrically connected to the driving motor via a switch, in the emergency operation case, and makes available the energy for an excursion into a safe blade setting. The use as an emergency energy supply device for a gondola rotary drive is conceivable. In a case of emergency operation, it can be used to turn the gondola out of the wind.

LIST OF REFERENCE NUMERALS 1 actuating drive
10 a.c. mains system
11 rectifier
12 link-circuit capacitor
14 link circuit
15 d.c.-to-a.c. inverter
16 three-phase a.c. motor
20 emergency energy supply device
22 accumulator unit
24 accumulator unit
26 accumulator unit
28 accumulator unit
30 supply line
32 supply line
33 switch
34 fuse
36 diode
40 switch
41 switch
42 switch
43 switch
44 switch
45 switch
46 switch
47 switch
48 line
49 line
50 diode
51 diode
52 fuse
54 charging circuit
56 microcontroller
57 control signal
58 drive circuit
59 switching signals
62 resistor
63 switch
64 voltage measuring unit
66 data line
67 connecting terminal
68 connecting terminal
70 accumulator cell
71 accumulator cell
72 accumulator cell
73 accumulator cell
75 voltage measuring device
76 temperature sensor
78 communications interface
80 multiplexer
82 control signal
84 optocoupler

What is claimed is:

1. An actuating drive for a rotor blade in a wind power installation, comprising:
   an electric motor;
   a frequency converter that includes a rectifier capable of being supplied by a power supply system;
   a link connected to the rectifier;
   a d.c.-to-a.c. inverter for feeding the electric motor, wherein the link carries a specified nominal operating voltage in a network-fed normal operation of the frequency converter;
   an emergency energy supply device connected to the link and including an energy store that makes available an electrical support voltage;
   a diode having a forward direction and being connected between the energy store and the link, the diode being situated in such a way with respect to the forward direction that the diode feeds a support current from the energy store into the link if a link voltage falls below the support voltage, wherein:
      the diode prevents a current flow between the energy store and the link if the link voltage is greater than the support voltage,
      the support voltage amounts to less than 80% of a nominal operating voltage of the link; and
   a charging device for the energy store, a charge voltage of the charging device is less than the nominal operating voltage of the link.

2. The actuating drive as recited in claim 1, wherein the energy store includes a series connection of a plurality of accumulator units.

3. The actuating drive as recited in claim 2, further comprising:
   a switching device by which a single one of the accumulator units is able to be connected to the charging device, wherein the charging device is developed for charging the single accumulator unit.

4. The actuating drive as recited in claim 3, further comprising:
   a control device by which a respective charging state of an individual one of the accumulator units is able to be checked, and by which the switching device is able to be controlled as a function of a checking result.

5. The actuating drive as recited in claim 4, wherein the control device controls the switching device in such a way that an accumulator unit, whose voltage is less than a specified voltage value, is connected to the charging device.

6. The actuating drive as recited in claim 2, further comprising:
   a device for determining an internal resistance of an accumulator unit.

7. The actuating drive as recited in claim 6, further comprising:
   a control unit for activating a maintenance indication if the internal resistance of the accumulator unit is greater than a first threshold value.

8. The actuating drive as recited in claim 7, further comprising:

a shunting-out device for shunting out the accumulator unit if the internal resistance of the accumulator unit is greater than a second threshold value.

9. The actuating drive as recited in claim 8, wherein at least one of the first threshold value and the second threshold value follows a characteristics curve that is a function of a temperature of the accumulator unit.

10. The actuating unit as recited in claim 2, wherein the plurality of accumulator units includes 8 lithium ion accumulator units.

11. An emergency energy supply device for supplying an electrical actuating drive of a wind power installation, in an emergency operation, in response to a failure of a power supply system that supplies the actuating drive with electrical energy in normal operation, comprising:
   an energy store that includes a plurality of accumulator units connected in series, the accumulator units including 8 lithium ion accumulator units;
   a charging device for charging the accumulator units;
   a switching device by which an individual one of the accumulator units is able to be connected to the charging device, wherein the charging device is developed for charging the single accumulator unit; and
   a control device by which a respective charging state of an individual one of the accumulator units is able to be checked, and by which the switching device is able to be controlled as a function of a checking result.

12. The emergency energy supply device as recited in claim 11, wherein the control device controls the switching device in such a way that the accumulator unit, whose voltage is less than a specified voltage value, is connected to the charging device.

13. The emergency energy supply device as recited in claim 11, wherein each accumulator unit includes a monitoring circuit by which at least one of a voltage and a temperature of the accumulator unit is able to be recorded.

14. The emergency energy supply device as recited in claim 13, further comprising:
   a communications connection capable of being produced between the control device and the monitoring circuit.

15. The emergency energy supply device as recited in claim 11, further comprising:
   a device for determining an internal resistance of an accumulator unit.

16. The emergency energy supply device as recited in claim 15, further comprising:
   a control unit for activating a maintenance indication if an internal resistance of one of the accumulator units is greater than a first threshold value.

17. The emergency energy supply device as recited in claim 15, further comprising:
   a shunting-out device for shunting out an accumulator unit if the internal resistance of the accumulator unit is greater than a second threshold value.

* * * * *